(12) United States Patent
Kotani et al.

(10) Patent No.: US 7,010,127 B2
(45) Date of Patent: Mar. 7, 2006

(54) CRYPTOGRAPHIC COMMUNICATION METHOD, FILE ACCESS SYSTEM AND RECORDING MEDIUM

(75) Inventors: Seigo Kotani, Kawasaki (JP); Takaoki Sasaki, Tokyo (JP); Yusuke Yamanaka, Tokyo (JP); Takayuki Hasebe, Kawasaki (JP); Ryota Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 785 days.

(21) Appl. No.: 09/739,757

(22) Filed: Dec. 20, 2000

(65) Prior Publication Data

US 2001/0009582 A1   Jul. 26, 2001

(30) Foreign Application Priority Data

Jan. 26, 2000   (JP)   ............................. 2000-016657

(51) Int. Cl.
*G06F 17/00* (2006.01)
(52) U.S. Cl. ...................... 380/277; 380/255; 380/278
(58) Field of Classification Search ................ 380/271, 380/277–279, 255–257; 713/150, 153
See application file for complete search history.

(56) References Cited

U.S. PATENT DOCUMENTS 5,222,137 A * 6/1993 Barrett et al. ................ 380/271
6,041,123 A * 3/2000 Colvin, Sr. .................. 713/153

FOREIGN PATENT DOCUMENTS

JP   10-301856   11/1998

OTHER PUBLICATIONS

Bruce Schneier, 1996, John Wiley & Sons, Inc., "Applied Cryptography", pp.: 217, 218, 228, and 229.*

"Mapping a Network Drive", Feb. 25, 1999, [Retreived from Internet May 28, 2004], "http://www.crosby.isd.esc4.net/help/map/".*

Key management for restricted multicast using broadcast encryption; Abdalla, M.; Shavitt, Y.; Wool, A.; Networking, IEEE/ACM Transactions on; vol. 8, Issue 4, Aug. 2000 Page(s):443-454.*

A public key encryption system for defective data transmission;Naujoks, R.; Gustafsson, M.;Enabling Technologies: Intrastructure for Collaborative Enterprises, 1998. (WET ICE '98) Proceedings., Seventh IEEE International Workshops on Pgs 346-351.*

Secure signals transmission based on quaternion encryption scheme; Nagase, T.; Komata, M.; Araki, T.; Advanced Information Networking and Applications, 2004. AINA 2004; 18th International Conference on; vol. 2, 2004 Page(s):35-38 vol. 2.*

* cited by examiner

*Primary Examiner*—David Jung
(74) *Attorney, Agent, or Firm*—Staas & Halsey LLP

(57) ABSTRACT

A cryptographic communication method is provided in which a cryptographic communication is performed by an easy operation even if both enciphered data and unenciphered data are mixed to be handled. In the transmission side, a communication key is used for enciphering data to be transmitted, and in the reception side the same communication key as in the transmission side is used for decoding received data. In the transmission side, an individual key that is different from the communication key is used for enciphering the data to be transmitted, the enciphered data are decoded by using the individual key first, and then the decoded data are enciphered by using the communication key so that the enciphered file can be transmitted.

12 Claims, 14 Drawing Sheets

Fig. 2
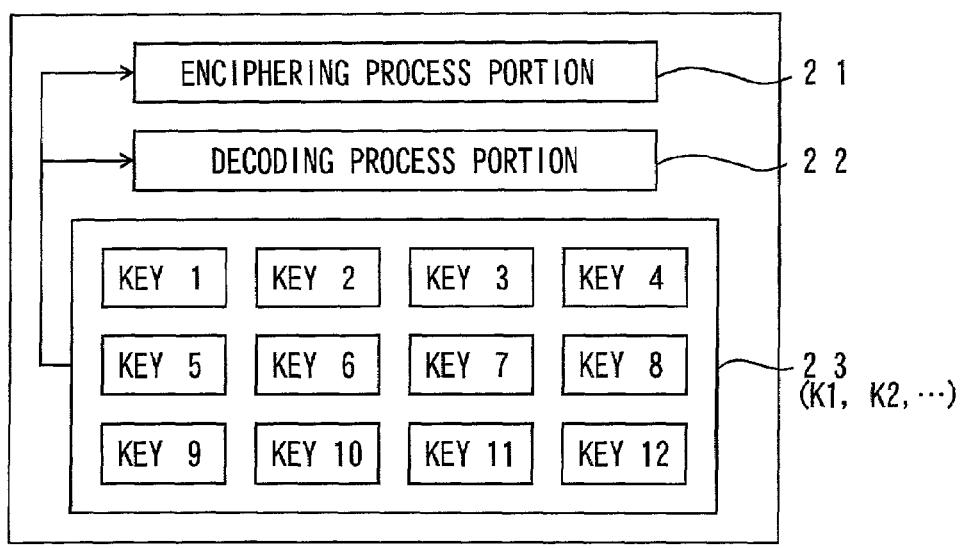
Fig. 3A    Fig. 3B
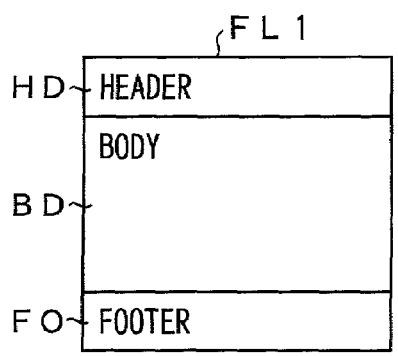
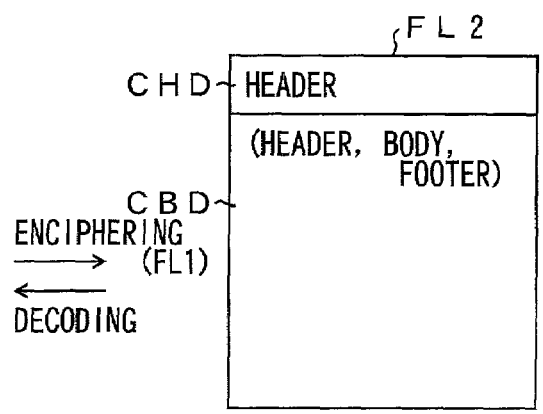

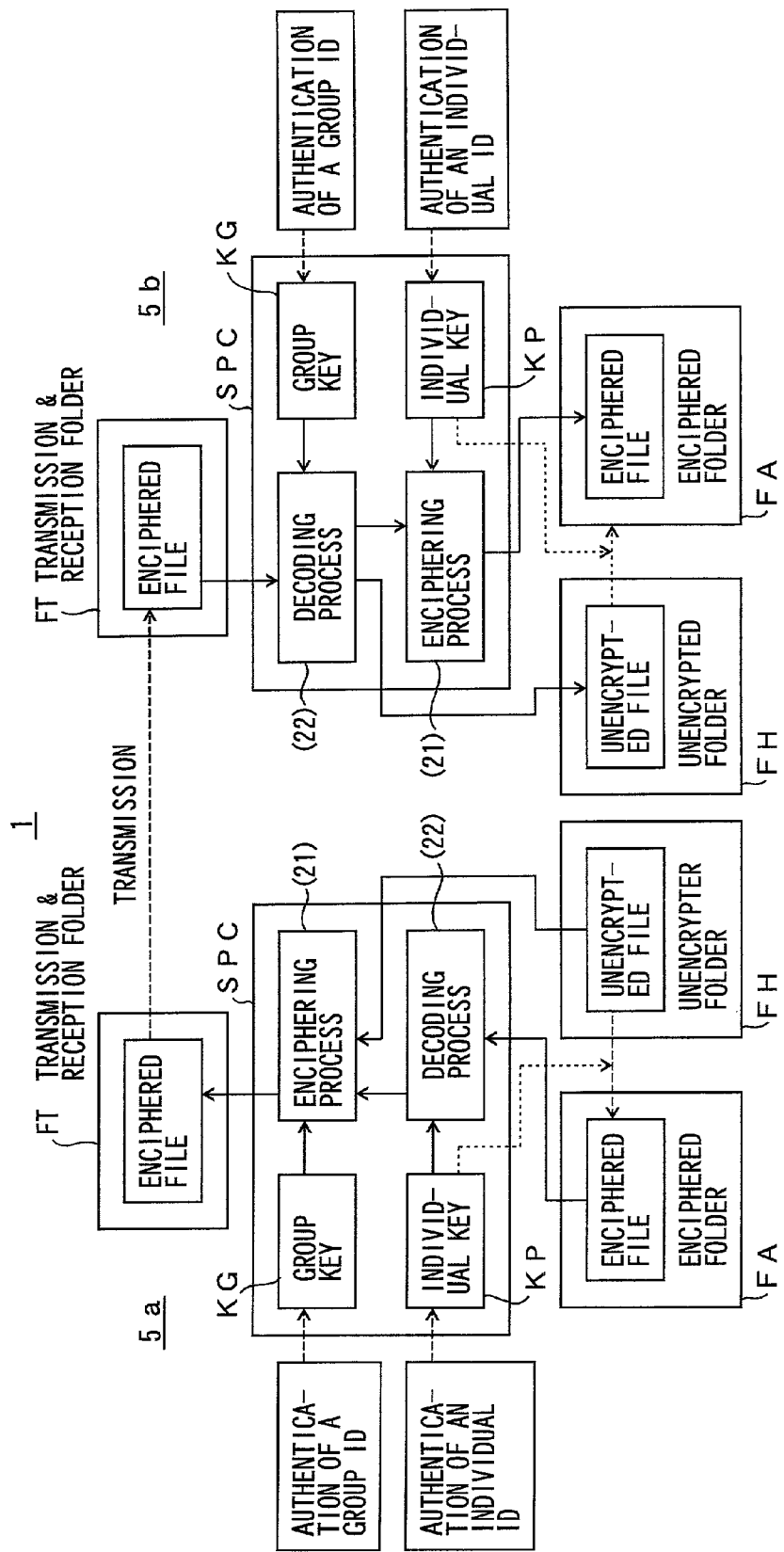

HG1

| USER ID |  | OK |
|---------|--|----|
| PASSWORD |  | CANCEL |

HG2

CRYPTOGRAPHIC COMMUNICATION METHOD, FILE ACCESS SYSTEM AND RECORDING MEDIUM

BACKGROUND OF THE INVENTION

1. Field of the Invention

The present invention relates to a cryptographic communication method, a file access system and a recording medium.

Along with the widespread use of personal computers, a communication using a computer network such as an electronic mail has become an essential tool for business. Considering that data are not only used in an individual computer but also transmitted via a network, the data security should be realized totally.

2. Description of the Prior Art

Conventionally, a communication method is known well in which a key is used for enciphering data to be transmitted for data security in the electronic mail, and the same key is used in the reception side for decoding received data.

The applicant has proposed a file access system for security of files used in a personal computer as disclosed in Japanese unexamined patent publication No. 10-301856. According to this method, while the key is activated after the user is authenticated, any file is automatically enciphered by entering the file in a designated folder. When reading the file in the folder, the file is automatically decoded. A user who has the right can read and can edit the enciphered file in the same way as a normal file without considering that the file is enciphered.

The above-mentioned file access system is an outstanding system for dealing with various contents such as a database or a file within a personal computer.

However, the system is not suitable for transmitting the contents to another computer after enciphering them, or for using enciphered contents that were transmitted from another computer after enciphering by a personal key.

For example, when transmitting enciphered contents as an attached file of an electronic mail, the attached file is automatically decoded by the read command for making the attached file. In order to prevent this situation from being generated, it is necessary to stop the function of the key in advance. However, this operation is so complicated that there is a possibility of transmitting the attached file without enciphering.

In addition, when transmitting non-enciphered contents as an enciphered attached file, the key should be activated for the enciphering, and then the function of the key should be stopped before making the attached file by the read command. This operation is also complicated, and there is a possibility of transmitting an attached file that is decoded by a misoperation.

SUMMARY OF THE INVENTION

The object of the present invention is to provide a cryptographic communication method in which the enciphering operation can be performed easily without a misoperation in the case of dealing with mixed data of enciphered data and not enciphered data.

According to a first aspect of the present invention, a cryptographic communication method is provided in which a communication key is used for enciphering data to be transmitted in the transmission side, and a key is used for decoding received data in the reception side. In the transmission side an individual key that is different from the communication key is used for enciphering the data to be transmitted, the enciphered data are decoded by using the individual key first, and then the decoded data are enciphered by using the communication key so that the enciphered file can be transmitted.

According to a second aspect of the present invention, in the cryptographic communication method a file identifier of the original data is embedded in a file name, and a new identifier indicating that the data are the enciphered data are added to the data when enciphering the data by using the communication key.

According to a third aspect of the present invention, a cryptographic communication method is provided in which a key is used for enciphering data to be transmitted in the transmission side, and a communication key is used for decoding received data in the reception side. In the reception side the received data are decoded by using the communication key, and then the decoded data are enciphered to be memorized by using an individual key that is different from the communication key, and the decoded data are erased.

According to a fourth aspect of the present invention, in the cryptographic communication method an authentication is performed independently for the individual key and the communication key so that the enciphering or the decoding can be performed by using the individual key and the communication key.

According to a fifth aspect of the present invention, a cryptographic communication method is provided in which a communication key is used for enciphering data to be transmitted in the transmission side, and a communication key is used for decoding received data in the reception side. An identification code corresponding to the communication key used for the enciphering is added to the enciphered data when enciphering in the transmission side, and in the reception side the communication key corresponding to the identification code is used for the decoding.

According to a sixth aspect of the present invention, in the cryptographic communication method plural communication keys are prepared in the transmission side, one of the keys is used for enciphering data, and an identification code corresponding to the key used for the enciphering is added to the enciphered data.

According to a seventh aspect of the present invention, in the cryptographic communication method plural communication keys are prepared in the reception side, and one of the communication keys that corresponds to the identification code is selected to be used.

According to an eighth aspect of the present invention, a file access system is provided in which two different keys are authenticated individually so that they can be used, and a decoding process using one of the keys and an enciphering process using the other of the keys are performed continuously for one file.

According to a ninth aspect of the present invention, a file access system is provided in which two different keys are authenticated individually so that they can be used, it is decided whether a target file is enciphered, the target file is decoded by using one of the keys if the target file is enciphered, the target file is not processed if the target file is not enciphered, and the other of the keys is used for enciphering the unenciphered file.

According to a tenth aspect of the present invention, a file access system is provided in which two different keys are authenticated individually so that they can be used, an enciphered file is decoded by using one of the keys, it is decided whether a target folder for storing the file is for encipher files, the file is enciphered by using the other of the keys and is stored if the target folder is for encipher files, and the file is stored without any process if the target folder is for encipher files.

According to an eleventh aspect of the present invention, a file access system is provided in which a display including a first folder and a second folder is performed, decoding and/or enciphering process of a file stored in the first folder when an instruction is inputted for moving the file from the first folder to the second folder, and the decoded and/or enciphered file is stored in the second folder.

According to a twelfth aspect of the present invention, in the file access system it is decided whether the file stored in the first folder is enciphered, the file is decoded by using a first key if the file is enciphered, the file is not processed if the file is not enciphered, and then the unenciphered file is enciphered by using a second key.

According to a thirteenth aspect of the present invention, a recording medium is provided on which a program of file access is recorded. The program is for a computer to perform the process that comprises the steps of authenticating two different keys individually so that they can be used, and performing a decoding process by using one of the keys and an enciphering process by using the other of the keys continuously for one file.

According to a fourteenth aspect of the present invention, an encipher processing device is provided that is used for a cryptographic communication in which a communication key is used for enciphering data to be transmitted in the transmission side, and a key is used for decoding received data in the reception side. The encipher processing device comprises the communication key, an individual key that is different from the communication key, and a process portion for performing a decoding process by using the individual key and an enciphering process by using the communication key continuously.

In the present invention, the communication key used in the transmission side and the communication key used in the reception side can be the same common key or different keys.

BRIEF DESCRIPTION OF THE DRAWINGS

FIG. 2 is a block diagram showing a structure of the enciphering card.

FIGS. 3A and 3B are diagrams showing the states before and after the enciphering process using a group key.

FIG. 4 is a block diagram showing a function of the communication terminals when performing the cryptographic communication.

DESCRIPTION OF THE PREFERRED EMBODIMENTS

Hereinafter, the present invention will be explained more in detail with reference to embodiments and drawings.

Figure 1:
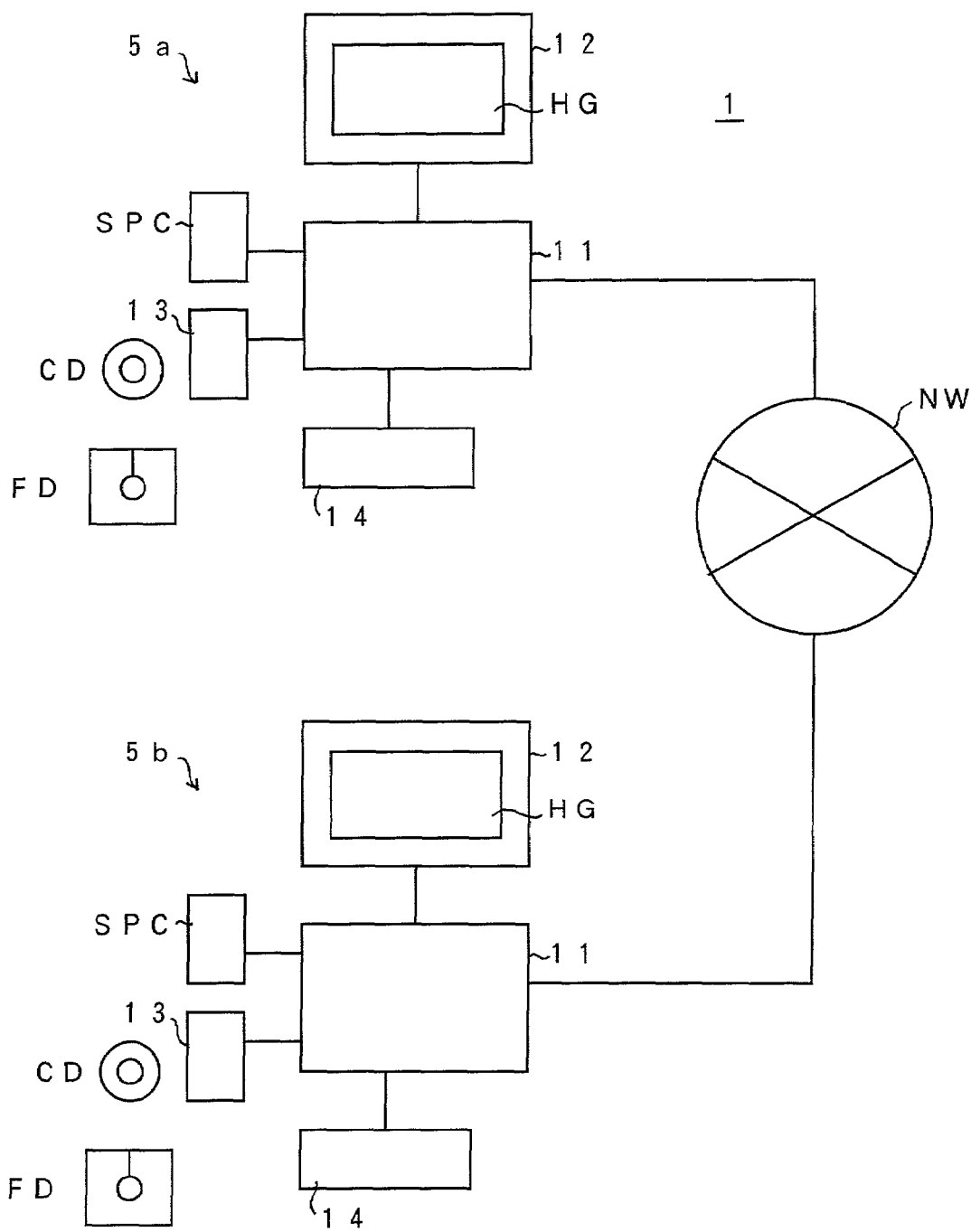
FIG. 1 is a block diagram showing an example of a communication system 1.

FIG. 1 is a block diagram showing an example of a communication system 1. FIG. 2 is a block diagram showing a structure of the enciphering card SPC. FIGS. 3A and 3B are diagrams showing the states before and after the enciphering process using a group key.

In FIG. 1, the communication system 1 includes plural communication terminals 5a, 5b, . . . that are connected to a network NW. The network NW can be a LAN, a WAN, a public telephone line, a dedicated line, a wireless line, the Internet or a combination network of them. It can be a network NW via plural networks. The communication terminals 5a, 5b, can be personal computers, for example. An example of the structure is shown in the figure. Hereinafter, one of the communication terminals 5a, 5b, or the whole of them may be referred to as a "communication terminal 5."

The communication terminal 5 includes a processing device 11, a display device 12, drive device 13, input device 14, an enciphering card SPC, and other devices.

The processing device 11 includes a CPU, a ROM, a main memory, an external memory device, a communication control circuit, a various interface, and other peripheral circuits. The processing device 11 performs a process for the cryptographic communication according to the present invention working together with other devices, especially with the enciphering card SPC and other various processes such as a file access process. The external memory device memorizes an application program for the cryptographic communication according to the present invention, other programs, various files, tables, databases, and other data.

The display device 12 displays images, characters and various displays on its screen HG.

The drive device 13 accesses a recording medium such as a CD-ROM (CD), a floppy disk FD, or a magneto-optic disk when it is set for reading or writing data or a program.

The input device 14 is a keyboard, a mouse or other pointing device that is used for inputting data or giving instructions to the processing device 11.

As shown in FIG. 2, the enciphering card SPC includes an enciphering process portion 21, a decoding process portion 22 and a key portion 23.

The key portion 23 stores many keys K1, K2, K3, . . . . In the illustrated example, twelve keys K are shown, but the number of keys can be less or more than twelve, e.g., sixteen. Each of the keys K corresponds to the identification code. When using the enciphering card SPC, an authentication is performed for certifying the user at the starting step. At that time, a user ID or a group ID that corresponds to the identification code is inputted, and the key K that is identical to the identification code is selected. The user key K that is selected by the ID (an individual ID) works as an individual key KP, and the key K that is selected by the group ID works as a group key KG.

In this embodiment, at least one common key K should be prepared in both the transmission side and the reception side when performing the cryptographic communication.

The enciphering process portion 21 and the decoding process portion 22 performs the enciphering process or the decoding process using the key K selected by the key portion 23. Each of the processes is a reversible process. Namely, the original state can be obtained by the decoding process after the enciphering process or by the processes in the opposite order. An example of the processes is explained in the above-mentioned Japanese unexamined patent publication No. 10-301856.

However, when performing the enciphering process or the decoding process by the group key KG, a header is added to the original data or is removed from the same.

For example, as shown in FIG. 3A, it is supposed that there is a file FL1 including a header HD, a body BD and a footer FO. The group key KG is used for the enciphering process of this file FL1. As shown in FIG. 3B, the entire file FL1 is enciphered to be a body CBD, and a new header CHD is added to the body CBD so as to make a new file FL2. On this occasion, an identification code (a group ID) that is attribute information corresponding to the group key KG is added to the header CHD. By performing the decoding process of the file FL2 using the group key KG, it goes back to the file FL1.

The enciphering card SPC is a PC card in this embodiment, but it can be other form. In addition, though the enciphering process and the decoding process are performed by using the enciphering card SPC in this embodiment, the same processes can be performed by a software without using the enciphering card SPC.

FIG. 4 is a block diagram showing a function of the communication terminals 5a, 5b when performing the cryptographic communication. The communication terminal 5a is described as the transmission side, and the communication terminal 5b is described as the reception side in FIG. 4. However, each of the communication terminals 5a and 5b can perform either the transmission or the reception.

In FIG. 4, the communication terminal 5a of the transmission side includes an enciphered folder FA, an unencrypted folder FH, a transmission and reception folder FT and an enciphering card SPC.

When the enciphered folder FA is activated, if a file is moved from the other folder to the enciphered folder FA, the file is automatically enciphered, so that the enciphered file is stored in the enciphered folder FA. When a file (an enciphered file) stored in the enciphered folder FA is moved to the other folder, the file is automatically decoded, so that the decode file (an unencrypted file) is stored in the target folder.

Namely, the enciphering process is performed when a file enters the enciphered folder FA, and the decoding process is performed when a file goes out of the enciphered folder FA. Any kind of file to be moved is acceptable. It can be an enciphered file or an unencrypted file. If an enciphered file enters the enciphered folder FA, it is encipher again, which can be returned to the unencrypted file by performing the decoding process twice.

An enciphered file stored in the enciphered folder FA is automatically decoded when it is read out, and the unencrypted file is displayed on the screen HG or printed by a printer. Therefore, the user can read and edit an enciphered file in the enciphered folder FA in the same way as a normal file without being conscious that the file is enciphered.

The individual key KP is used as the key K that is used for the enciphering process or the decoding process of the file that is inputted in or outputted from the enciphered folder FA.

The unencrypted folder FH is any normal folder that is generated under the normal OS or the application. The unencrypted folder FH stores an unencrypted file. However, it can also store an enciphered file.

As shown by the broken line in FIG. 4, when moving an unencrypted file in the unencrypted folder FH into the enciphered folder FA, the enciphering process using the individual key KP is performed, and the enciphered folder FA stores the enciphered file.

The transmission and reception folder FT is a folder for storing a file to be transmitted and a received file that are used for the cryptographic communication. The user can select which folder provided by the normal OS or the application is selected as the transmission and reception folder FT, as being explained later. In order to transmit a file stored in the transmission and reception folder FT, the file is made an attached file of an electronic mail, for example. In addition, it is set to input a file that is received via an electronic mail into this transmission and reception folder FT.

When moving the enciphered file stored in the enciphered folder FA to the transmission and reception folder FT, the individual key KP is used first for performing the decoding process 22, and then the group key KG is used for performing the enciphering process 21 of the decoded file. Namely, the enciphered file that was enciphered by the individual key KP and was stored in the enciphered folder FA is enciphered by the group key KG, and the enciphered file is stored in the transmission and reception folder FT. Though it is not illustrated, a temporary folder is provided for the decoding process 22 and the enciphering process 21.

In addition, when moving the unencrypted file stored in the unencrypted folder FH to the transmission and reception folder FT, the group key KG is used for performing the enciphering process 21. Namely, the enciphered file that was enciphered by the individual key KP and was stored in the enciphered folder FA is enciphered by the group key KG, and the enciphered file is stored in the transmission and reception folder FT.

Thus, even the file that was stored either in the enciphered folder FA or the unencrypted folder FH can be enciphered by the group key KG after passing the enciphering card SPC, and the enciphered file is stored in the transmission and reception folder FT. Therefore, either the enciphered file or the unencrypted file, when it is made an attached file of an electronic mail, can be easily enciphered by the group key KG so as to be an enciphered file.

Next, the communication terminal 5b of the reception side includes an enciphered folder FA, an unencrypted folder FH, a transmission and reception folder FT and an enciphering card SPC.

The enciphered folder FA, the unencrypted folder FH, and the transmission and reception folder FT are the same as explained above.

It is supposed that a received electronic mail or an attached file thereof has entered the transmission and reception folder FT. Namely, an enciphered file that was enciphered by the group key KG enters the transmission and reception folder FT.

When moving the enciphered file stored in the transmission and reception folder FT to the enciphered folder FA, the decoding process 22 is performed first by using the group key KG, and then the enciphering process 21 of the decoded file is performed by using the individual key KP. Namely, the enciphered file that was enciphered by the group key KG and was transmitted so as to be stored in the transmission and reception folder FT is enciphered by the individual key KP, and the enciphered file is stored in the enciphered folder FA.

In addition, when moving the file from the transmission and reception folder FT to the unencrypted folder FH, the decoding process 22 is performed using a group key KG. Namely, the enciphered file stored in the transmission and reception folder FT is decoded by the group key KG, and the unencrypted file is stored in the unencrypted folder FH.

Thus, the enciphered file that was stored in the transmission and reception folder FT is stored in the enciphered folder FA as an enciphered file enciphered by the individual key KP or is stored in the unencrypted folder FH as an unencrypted file when passing the enciphering card SPC.

In each communication terminal 5, it is necessary to input a user ID and a group ID and to select the individual key KP and the group key KG for activating them before using the enciphering card SPC.

Next, the process in the communication terminal 5 will be explained in detail with reference to the flowchart and the screen display.

Figure 5:
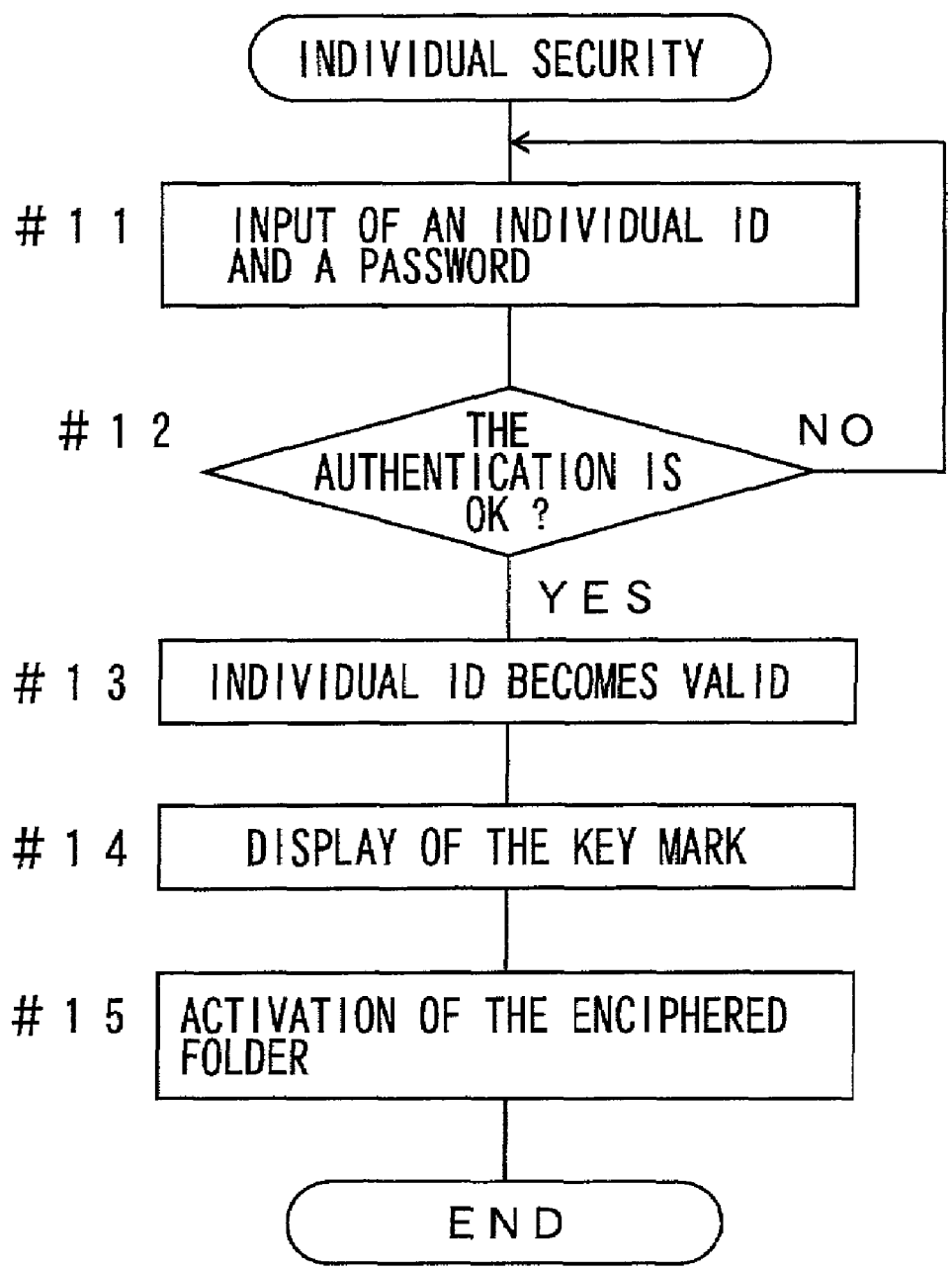
FIG. 5 is a flowchart showing a process of an individual security.
Figure 6:
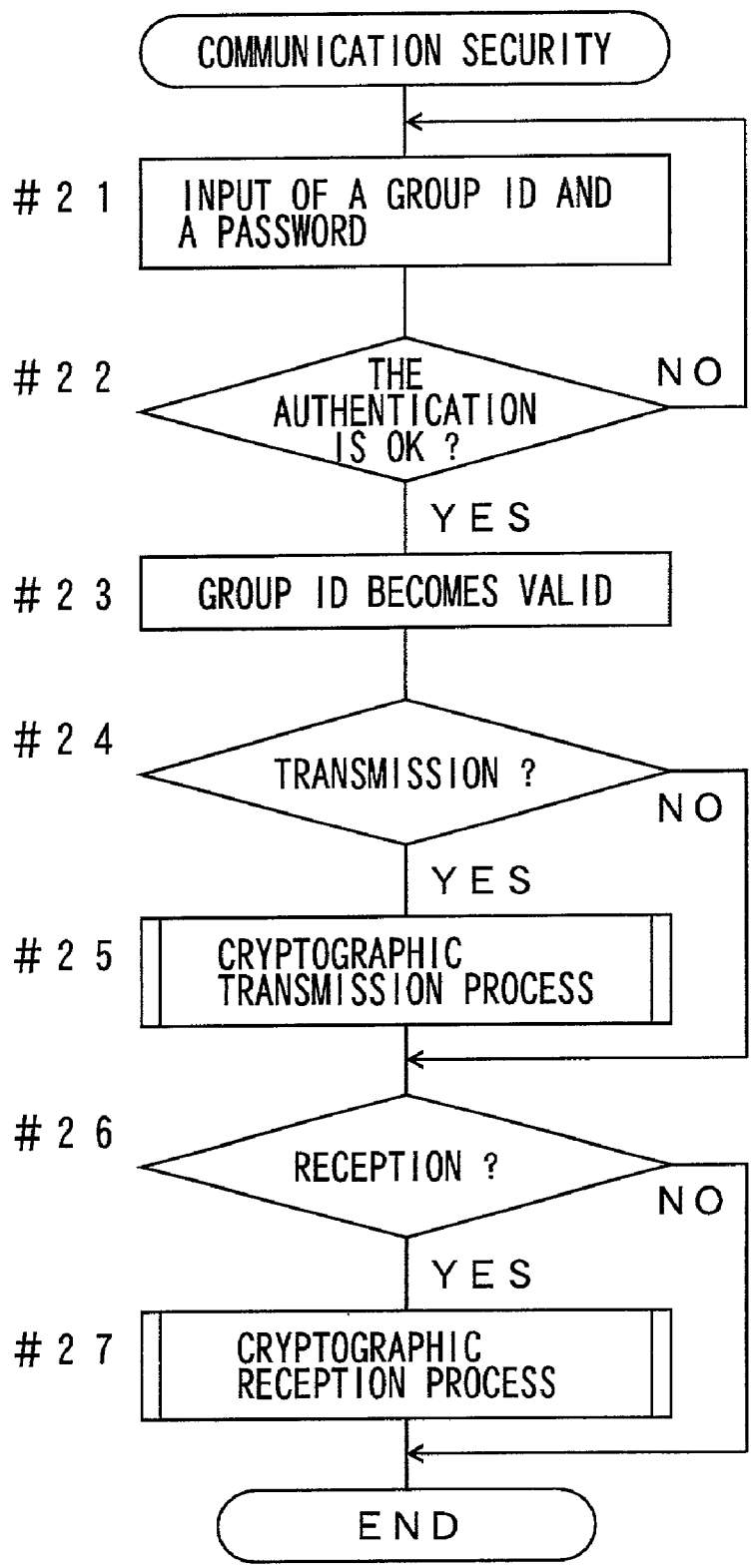
FIG. 6 is a flowchart showing a process of a communication security.
Figure 7:
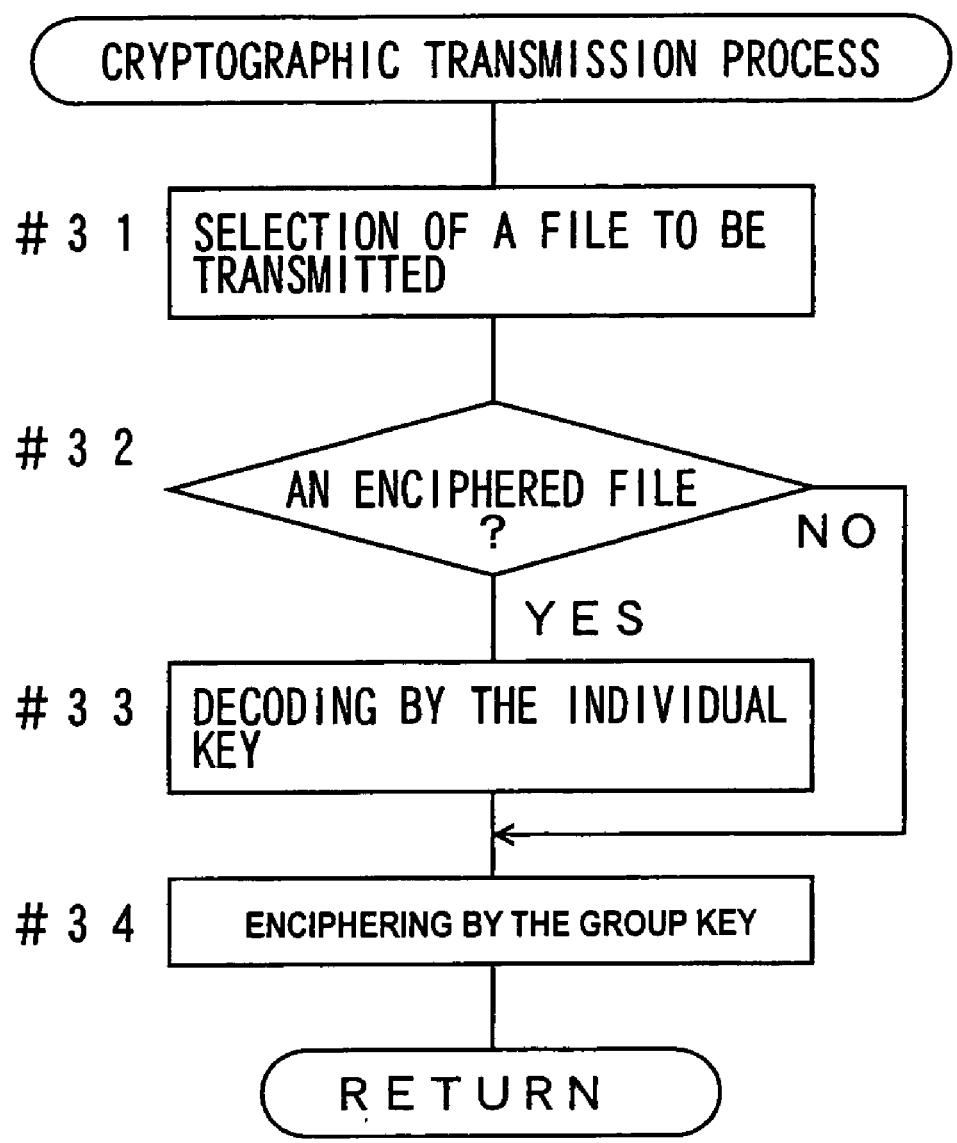
FIG. 7 is a flowchart showing a cryptographic transmission process.
Figure 8:
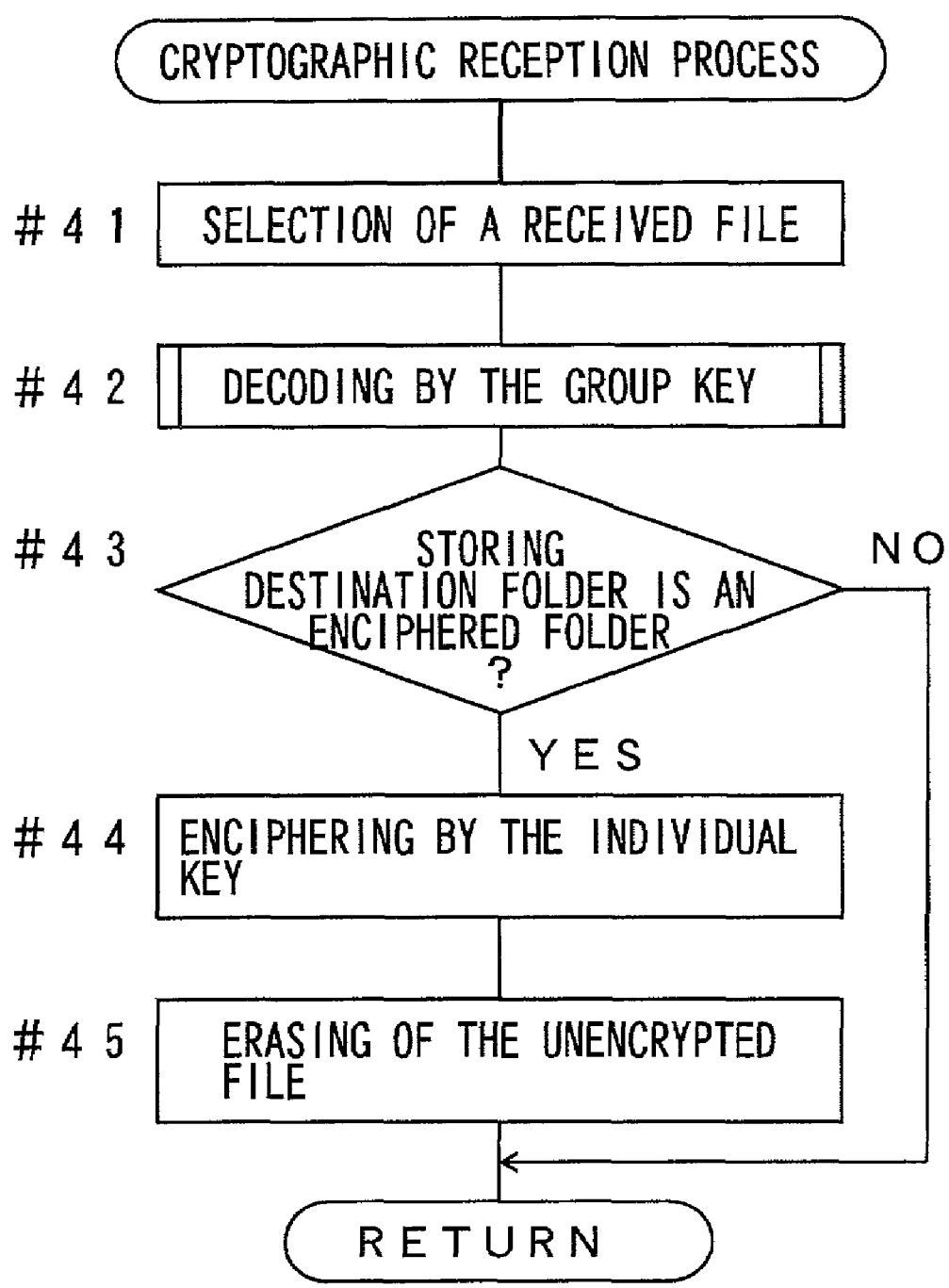
FIG. 8 is a flowchart showing a cryptographic reception process.
Figure 9:
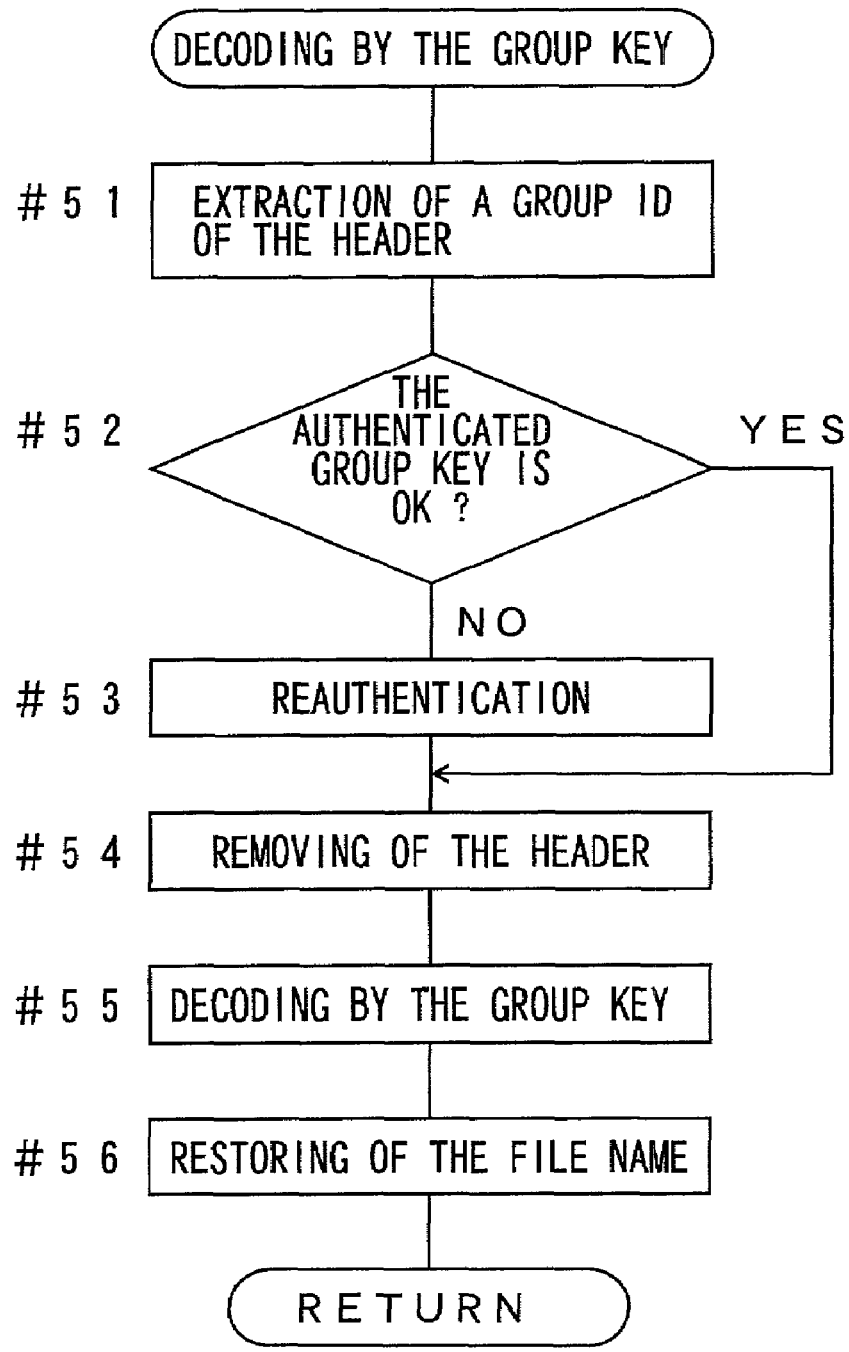
FIG. 9 is a flowchart showing a decoding process by a group key.
Figures 10, 11:
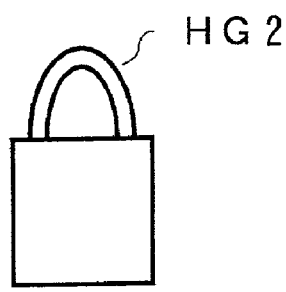
FIG. 10 is a diagram showing a display for authentication of an individual ID.
FIG. 11 is a diagram showing the state where the individual key is activated.
Figures 12, 13:
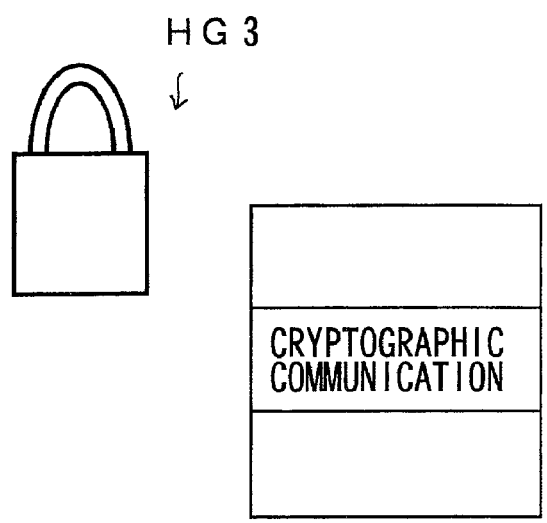
FIG. 12 is a diagram showing a display of a pull-down menu for a cryptographic communication.
FIG. 13 is a diagram showing a display for authentication of a group ID.
Figure 14A:
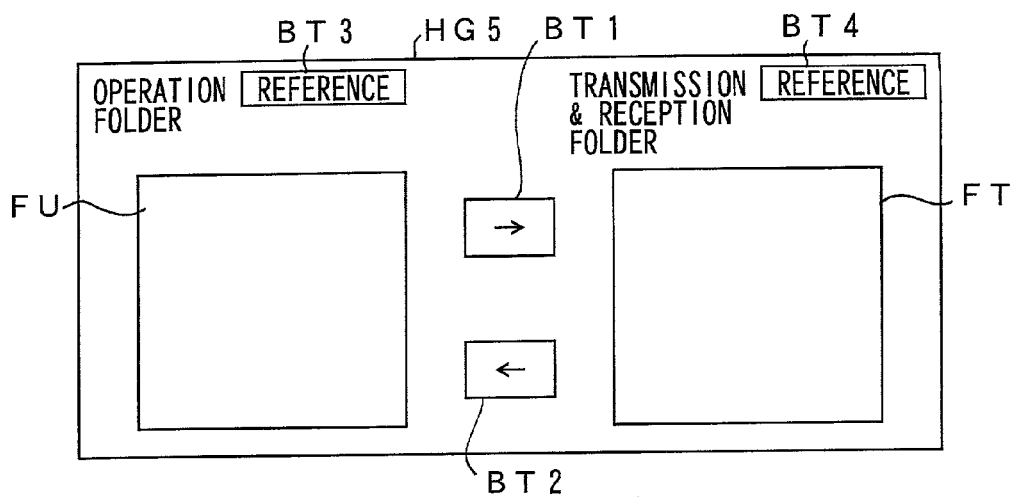
FIGS. 14A–14C are diagrams showing states for selecting a transmission file in the transmission process.
Figure 14B:
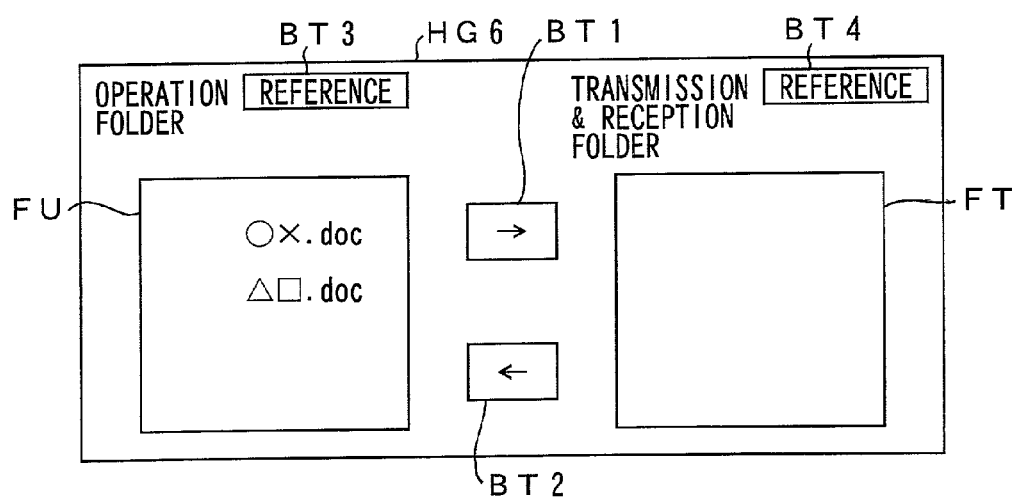
Figure 14C:
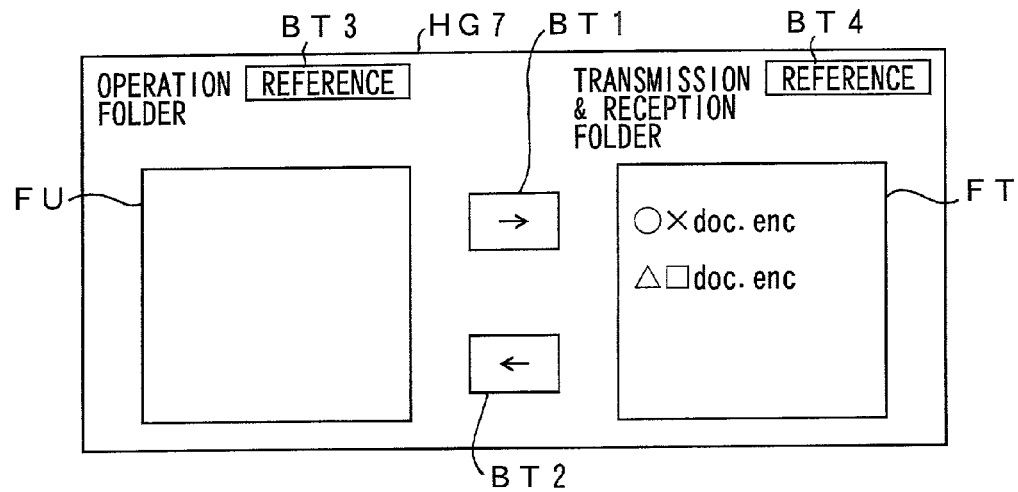
Figure 15:
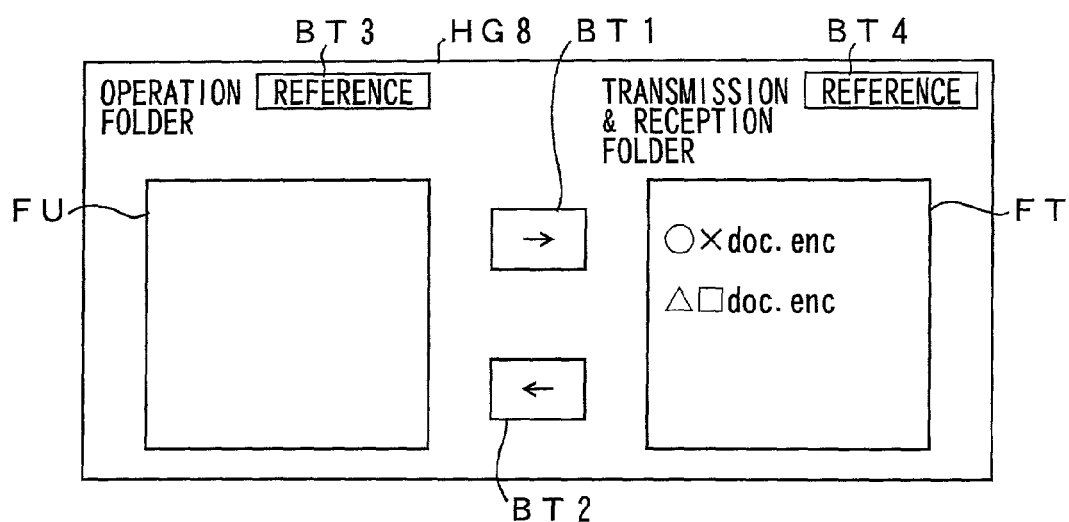
FIG. 15 is a diagram showing a state of a received file in the reception operation.

FIG. 5 is a flowchart showing a process of an individual security. FIG. 6 is a flowchart showing a process of a communication security. FIG. 7 is a flowchart showing a cryptographic transmission process. FIG. 8 is a flowchart showing a cryptographic reception process. FIG. 9 is a flowchart showing a decoding process by a group key. FIG. 10 is a diagram showing a display HG1 for authentication of an individual ID. FIG. 11 is a diagram showing a display HG2 when the individual key KP is activated. FIG. 12 is a diagram showing a display HG3 of a pull-down menu for a cryptographic communication. FIG. 13 is a diagram showing a display HG4 for authentication of a group ID. FIGS. 14A–14C are diagrams showing states for selecting a transmission file in the transmission process. FIG. 15 is a diagram showing a state of a received file in the reception operation.

The individual security shown in FIG. 5 is a preprocess that is necessary for ensuring the security of a file only by using the individual key KP in the communication terminal 5 without performing the communication.

Namely, when starting the application for the cryptographic communication (or the application for the individual security), the display HG1 for authentication of an individual ID appears first as shown in FIG. 10. Then, an individual ID (a user ID) and a password are inputted, and an "OK" button is pushed (or is clicked) (Step #11).

In this way, the authentication of an inputted individual ID and a password is performed (Step #12). If the authentication is OK, the individual key KP corresponding to the individual ID becomes valid (Step #13). Therefore, in the same communication terminal 5, plural users can ensure each security by setting an individual ID and a password for each user.

As shown in FIG. 11, a display HG2 of a key mark appears indicating that the individual key KP has become valid (Step #14), and the enciphered folder FA becomes activated (Step #15).

The communication security shown in FIG. 6 is a preprocess that is necessary for the cryptographic communication.

When clicking the key mark of the display HG2 shown in FIG. 11 by using a right button of the mouse, the display HG3 of a pull-down menu for the cryptographic communication appears as shown in FIG. 12. If the "cryptographic communication" is clicked, a display HG4 for authentication of a group ID appears as shown in FIG. 13. Then, a group ID and a password are inputted, and the "OK" button is pushed (Step #21).

In this way, the authentication of an inputted group ID and a password is performed (Step #22). If the authentication is OK, the group key KG corresponding to the group ID becomes valid (Step #23). At the same time, the next displays HG5–HG8 appear.

For the input of a group ID, it is preferable to input a group ID corresponding to the transmission destination. Namely, plural transmission destinations are designated in advance, and different group IDs are assigned to different transmission destinations, respectively. It is authorized that the same group ID is used in each transmission destination. Thus, among two or more communication terminals 5 that are designed for the communication, and only among the communication terminals 5, the same group ID, i.e., the same group key KG is used, so the security can be maintained.

As shown in FIG. 6, if the transmission is desired (Yes in Step #24), the cryptographic transmission process is performed (Step #25). If the reception is desired (Yes in Step #26), the cryptographic reception process is performed (Step #27).

As shown in FIG. 7, a file to be transmitted is selected first in the cryptographic transmission process (Step #31).

Namely, in the display HG5 shown in FIG. 14A, an operation folder FU is displayed in the left side, while the transmission and reception folder FT is displayed in the right side. A reference button BT3 or BT4 is displayed above each folder, and conversion buttons BT1, BT2 for instructing the conversion between the folders are displayed in the middle portion.

If the reference button BT3 is pushed, a list of folders is displayed, and a folder to be the operation folder FU is selected from the folders.

If the reference button BT4 is pushed, a list of folders is displayed, and a folder to be the transmission and reception folder FT is selected from the folders.

In the state shown in FIG. 14B, the operation folder FU stores two files (unencrypted files) that are "○x.doc" and "△□.doc." Then, if the conversion button BT1 is pushed, the enciphering process of the files is performed as shown in FIG. 14C. The files are moved from the operation folder FU to the transmission and reception folder FT, and the files that were in the operation folder FU are erased.

Namely, in FIG. 7, if the file in operation folder FU is an enciphered file (Yes in Step #32), the individual key KP is used for the decoding (Step #33), and next the group key KG is used for the enciphering (Step #34). If the file of the operation folder FU is not an enciphered file (No in Step #32), the file is enciphered by the group key KG (Step #34).

Upon the enciphering by the group key KG, a file identifier (a filename extension) of the original file is embedded in the file name, and a new identifier indicating that it is an enciphered file is added. In addition, a group ID corresponding to the group key KG is written in the header as attribute information.

In the example shown in FIG. 14B or 14C, the file name "○x.doc" is changed to the file name "○xdoc.enc." Namely, the file identifier "doc" of the original file is embedded in the file name to make "○xdoc," and a new identifier "enc" indicating that it is an enciphered file is added.

It is possible to add a code indicating a group ID to the identifier indicating that it is an enciphered file.

As shown in FIG. 8, a received file is selected first in the cryptographic reception process (Step #41).

Namely, in the display HG8 shown in FIG. 15, if the reference button BT4 is pushed, a list of folders is displayed, and a folder to be the transmission and reception folder FT is selected from the folders.

If the reference button BT3 is pushed, a list of folders is displayed, and a folder to be the operation folder FU is selected from the folders.

In the state shown in FIG. 15, the transmission and reception folder FT stores two files that are "○xdoc.enc" and "Δ □doc.enc." Then, if the conversion button BT2 is pushed, the decoding process of the files is performed. The files are moved from the transmission and reception folder FT to the operation folder FU, and the files that were in the transmission and reception folder FT are erased.

Namely, in FIG. 8, the files in the transmission and reception folder FT are decoded by the group key KG (Step #42). If the storing destination folder (the operation folder FU) is an enciphered folder FA (Yes in Step #43), the file is further enciphered by the individual key KP (Step #44), and then the unencrypted file is erased (Step #45).

A user can set whether the received file is automatically erased after the decode operation. If a file whose identifier is not "enc" is tried to enter the transmission and reception folder FT shown in FIG. 15, a warning is displayed.

In FIG. 9, a group ID of the header of the file to be decoded by the group key KG is extracted in the decoding process (Step #51). Then, the extracted group ID is compared with the group ID that was inputted in advance for the authentication, and it is decided whether the group key KG that is already authenticated is correct (Step #52). If they are not identical, the group ID is inputted again, for example (Step #53).

Then, the header is removed (Step #54), the decoding process by the group key KG is performed (Step #55), and the file name is restored (Step #56).

In the reception side, if there are plural group keys KG that can be used, it is possible to select automatically the group key KG to be used by the group ID that was extracted from the header of the received file. In this way, when plural enciphered files are received from plural transmission sides having different group keys KG, the reception side can select each group key KG automatically for decoding.

Next, another embodiment will be explained in which the operation method for the cryptographic communication is different.

Figure 16:
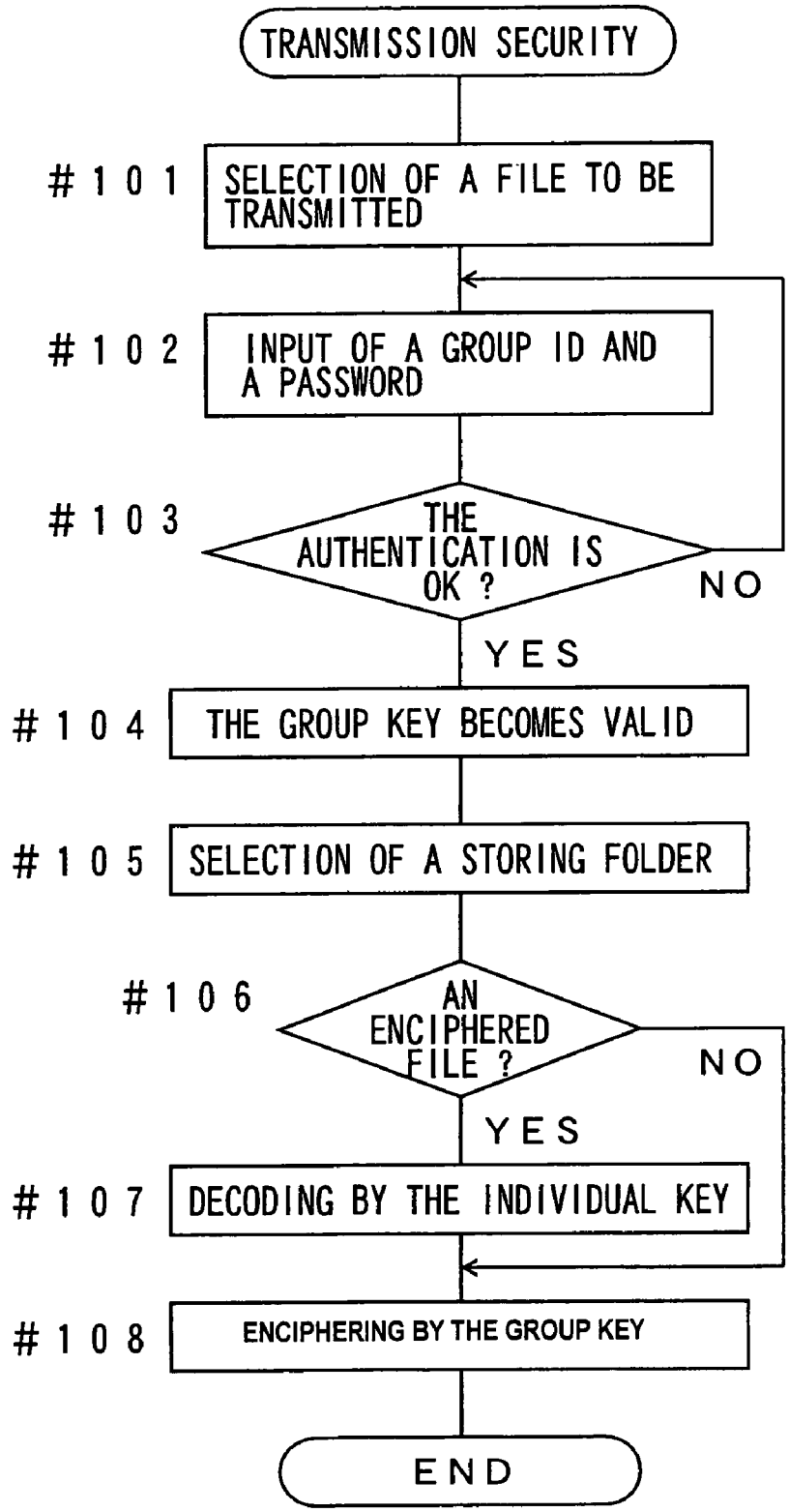
FIG. 16 is a flowchart of a process for selecting a transmission file in another embodiment.
Figure 17:
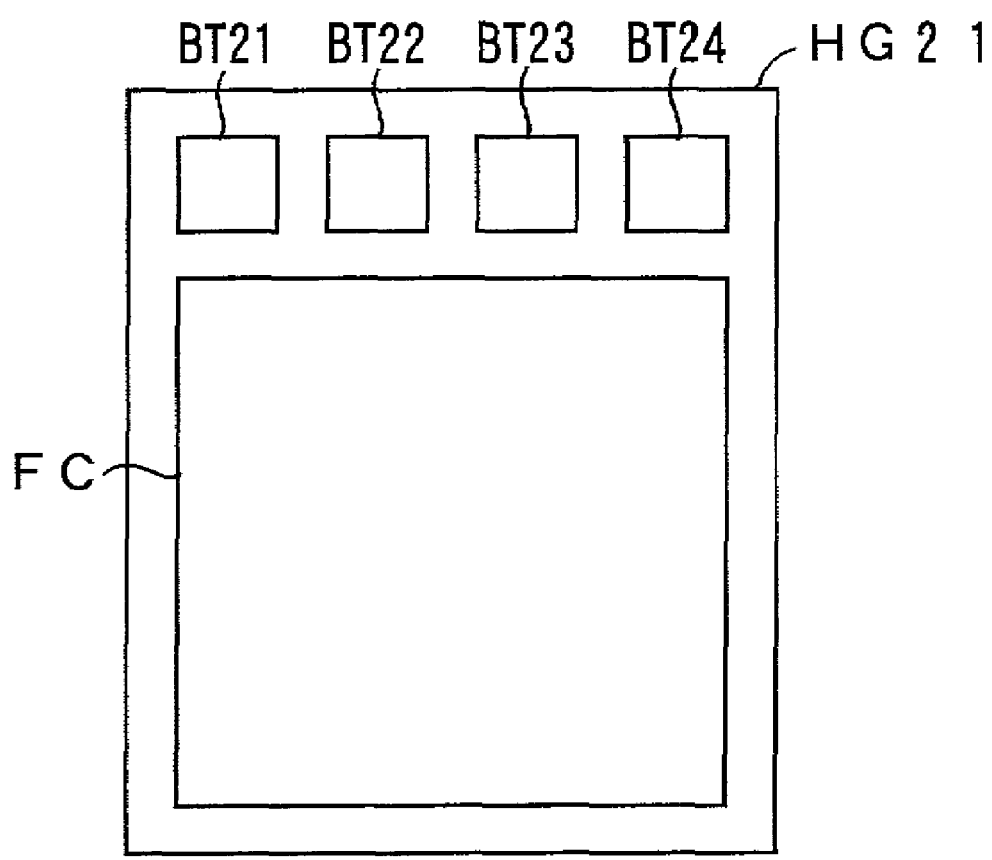
FIG. 17 is a diagram showing a main display for the file selection.

FIG. 16 is a flowchart process for selecting a transmission file in another embodiment. FIG. 17 is a diagram showing a main display HG21 for the file selection.

When starting the application for the cryptographic communication in the state where the application for the individual security has been started, i.e., in the state where the authentication of the individual ID has finished, a main display HG21 appears first as shown in FIG. 17.

In the main display HG21, a file selection button BT21, an encipherment button BT22, a decoding button BT23, an option button BT24, a list display column FC, and a progress bar (not shown) are displayed.

If the file selection button BT21 is pushed, a file selection display that is a standard of Windows appears, and a file to be enciphered or decode is selected. The selected file name is displayed in the list display column FC (Step #101).

If the encipherment button BT22 is pushed, a display HG4 for authentication of a group ID appears as shown in FIG. 13. Then, a group ID and a password are inputted, and the "OK" button is pushed (Step #102). An authentication of the inputted group ID and password is performed (Step #103).

If the authentication is OK, the group key KG corresponding to the group ID becomes valid (Step #104).

In the same time, a display for selecting a storing destination of the enciphered file appears, and an appropriate destination is designated (Step #105). If the file is an enciphered file (Yes in Step #106), the file is decoded by the individual key KP (Step #107), and then it is enciphered by the group key KG (Step #108). If the file is not an enciphered file, it is enciphered by the group key KG (Step #108).

According to the communication system 1 explained above, even if an enciphered file and an unenciphered file are mixed, the cryptographic communication can be performed by an easy operation without a misoperation.

In the above-mentioned embodiment, various types of personal computers or information terminals including a palmtop type, a note type, a laptop type and a desktop type can be used as the communication terminal 5.

In the above-mentioned embodiment, at least one common group key KG is prepared in both the transmission side and the reception side. This is a so-called common key cryptographic format. However, different keys can be used in the transmission side and the reception side without preparing a common key K for the enciphering and decoding. In addition, if a public-key cryptographic format is adopted, for example, the key for the enciphering is made available in public, and the key for the decoding is kept in secret. Furthermore, an entire structure of the communication system 1 or a part structure thereof, contents of the process, the order of the process, and a structure of the display can be changed in accordance with the present invention.

According to the present invention, even if enciphered files and unenciphered files are mixed, the cryptographic communication can be performed by an easy operation without a misoperation.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A cryptographic communication method, comprising:
   individually authenticating, in each transmission side, a common communication key and an individual transmission side only key that is different from the common communication key, thereby using both keys to encipher or decode in each transmission side,
   determining, in each transmission side, whether a target file is enciphered by the individual transmission side only key,
   decoding the target file using the individual transmission side only key, if determined that the target file is enciphered, and not decode processing the target file as an unprocessed target file, if determined that the target file is not enciphered; and
   enciphering for transmission, in each transmission side, the decoded target file or the unprocessed target file that is not enciphered, using the common communication key,
   wherein in each transmission side, the decoding using the individual transmission side only key and the enciphering using the common communication key are performed continuously, if the decoding is performed.

2. The cryptographic communication method according to claim 1, wherein a file identifier of the target file is embedded in a file name of the target file, and a new identifier indicating that the target file is the enciphered target file, is added to the file name of the target file when enciphering the decoded target file or the unprocessed target file by using the communication key.

3. A cryptographic communication method, comprising:
individually authenticating, in each reception side, a common communication key and an individual reception side only key that is different from the common communication key, thereby using both keys to encipher or decode in each reception side;
decoding, in each reception side, the received file using the common communication key;
determining, in each reception side, whether a target folder for storing the decoded file is for encipher files,
enciphering the decoded file using the individual reception side only key and storing the enciphered decoded file in the target folder, if the target folder is for encipher files, and storing the decoded file in the target folder without any encipher processing, if the target folder is not for encipher files,
wherein in each reception side the decoding process using the common communication key and the enciphering process using the individual reception side only key are performed continuously, if the enciphering process is performed.

4. A cryptographic communication method, comprising:
authenticating, in a transmission side, an individual transmission side only key,
authenticating a common communication key that is different from the individual side only key from among a plurality of common communication keys,
enciphering data to be transmitted in the transmission side using a common communication key from among the plurality of common communication keys,
determining, in the transmission side, whether a target file is enciphered by the individual transmission side only key,
decoding the target file using the individual transmission side only key, if determined that the target file is enciphered, and not decode processing the target file as an unprocessed target file, if determined that the target file is not enciphered,
enciphering for transmission, in the transmission side, the decoded target file or the unprocessed target file that is not enciphered, using the common communication key,
adding an identification code corresponding to the common communication key used for the enciphering, and
decoding, in the reception side, the enciphered target file received, from the transmission side, using a common communication key, from among a plurality of common communication keys, corresponding to the identification code added in the enciphered target file.

5. A file access system, wherein two different keys are authenticated individually, and for data transmission, a decoding process decodes enciphered data stored in an enciphered folder using one of the keys as an individual transmission side only key, and an enciphering process automatically enciphers the decoded data for the transmission using the other of the keys as a common communication key.

6. A file access system, wherein two different keys are authenticated individually, and a programmed computer processor controls the file access system according to a process of determining whether a target file to be transmitted is enciphered, decoding the target file by using one of the keys as an individual transmission side only key, if determined that the target file is enciphered, not decode processing the target file as an unprocessed target file, if the target file is not enciphered, and for transmission, enciphering the decoded target file or the unprocessed target file using the other of the keys as a common communication key.

7. A file access system, wherein two different keys are authenticated individually, and a programmed computer processor controls the file access system according to a process of decoding an enciphered file received from a transmission side by using one of the keys as a common communication key, determining whether a target folder for storing the decoded file is for encipher files, enciphering the decoded file by using the other of the keys as an individual reception side only key and storing the enciphered decoded file in the target folder, if the target folder is for encipher files, and storing the decoded file in the target folder without any encipher process, if the target folder is not for encipher files.

8. A file access system comprising a programmed computer processor controlling the file access system according to a process comprising:
displaying a first folder and a second folder,
decoding and/or enciphering a file stored in the first folder using a first transmission/reception side only key when an instruction is input for moving the file from the first folder to the second folder for transmission of the file,
determining whether the file stored in the first folder is enciphered,
decoding the file by using the first transmission/reception side only key, if determined that the file is enciphered, and not decode processing the file as an unprocessed file, if determined that the file is not enciphered,
enciphering the decoded file or the unprocessed file by using a second common communication key, and
storing the enciphered decoded file or the enciphered unprocessed file in the second folder for the transmission.

9. A computer-readable recording medium on which a program of file access is recorded, the program controlling a data transmitting computer according to a process comprising:
individually authenticating a common communication key and an individual transmission side only key that is different from the common communication key, thereby using both keys to encipher or decode in the transmitting computer;
determining whether a target file for transmission is enciphered by the individual transmission side only key;
decoding the target file using the individual transmission side only key, if determined that the target file is enciphered, and not decode processing the target file as an unprocessed target file, if determined that the target file is not enciphered; and
enciphering for transmission the decoded target file or the unprocessed target file that is not enciphered, using the common communication key.

10. An encipher processing device that is used for a cryptographic communication, the device comprising:
a common communication key;
an individual transmission side only key that is different from the common communication key;
means for individually authenticating the common communication key and the individual transmission side only key, thereby using both keys to encipher or decode in the encipher processing device;
means for deciding whether a target file is enciphered by the individual transmission side only key;

means for decoding the target file using the individual transmission side only key, if the target file is enciphered;

means for enciphering a decoded target file or a target file that is not enciphered, using the common communication key; and means for transmitting the target file enciphered by the common communication key;

wherein the decoding process using the transmission side only key and the enciphering process using the common communication key are performed continuously, if the decoding process is performed.

11. A cryptographic communication method, comprising:

using a common communication key to a transmission and reception side for enciphering and deciphering data to be transmitted and received by the transmission and reception side, respectively, and using an individual transmission side only key for decoding enciphered data stored in an enciphered folder at each transmission side and an individual reception side only key for enciphering data to be stored in an enciphered folder at each reception side, wherein in each transmission side, first, the stored enciphered data are decoded using the individual transmission side only key, and, second, the decoded data is enciphered using the common communication key for transmission, and wherein in each reception side, first, the received enciphered data are decoded using the common communication key, and, second, the decoded data is enciphered to be stored in the enciphered folder in the reception side using the individual reception side only key.

12. A cryptographic communication method, comprising:

using a common communication key for enciphering a file to be transmitted;

preparing a transmission and reception folder for storing the file to be transmitted by cryptographic communication;

preparing an enciphered folder for automatically performing an enciphering process on a file using an individual transmission/reception side only key to store the file as an enciphered file when the file is moved from another folder to the enciphered folder, and for automatically performing a decoding process on the enciphered file stored in the enciphered folder using the individual transmission/reception side only key when the enciphered file stored in the enciphered folder is moved to another folder;

decoding the file stored in the enciphered folder using the individual transmission/receptions side only key to encipher the decoded file using the common communication key for storing the common communication key enciphered file in the transmission and reception folder, when the file stored in the enciphered folder is moved to the transmission and reception folder;

enciphering the file stored in a folder other than the enciphered folder using the common communication key to store the common communication key enciphered file in the transmission and reception folder, when the file stored in the folder other than the enciphered folder is moved to the transmission and reception folder; and transmitting the common communication key enciphered file stored in the transmission and reception folder.

* * * * *

UNITED STATES PATENT AND TRADEMARK OFFICE
CERTIFICATE OF CORRECTION

PATENT NO.       : 7,010,127 B2                                      Page 1 of 1
APPLICATION NO.  : 09/739757
DATED            : March 7, 2006
INVENTOR(S)      : Seigo Kotani et al.

It is certified that error appears in the above-identified patent and that said Letters Patent is hereby corrected as shown below:

Title page, col. 2, line 1, Delete "Retreived" and insert -- Retrieved --.
Title page, col. 2, line 10, Delete "Intrastructure" and insert --Infrastructure --.

Signed and Sealed this

Twenty-sixth Day of December, 2006

JON W. DUDAS
*Director of the United States Patent and Trademark Office*